Oct. 4, 1932.　　　　R. T. BOWLING　　　　1,881,397
BRIQUETTING MACHINE
Filed May 31, 1930　　　3 Sheets-Sheet 1
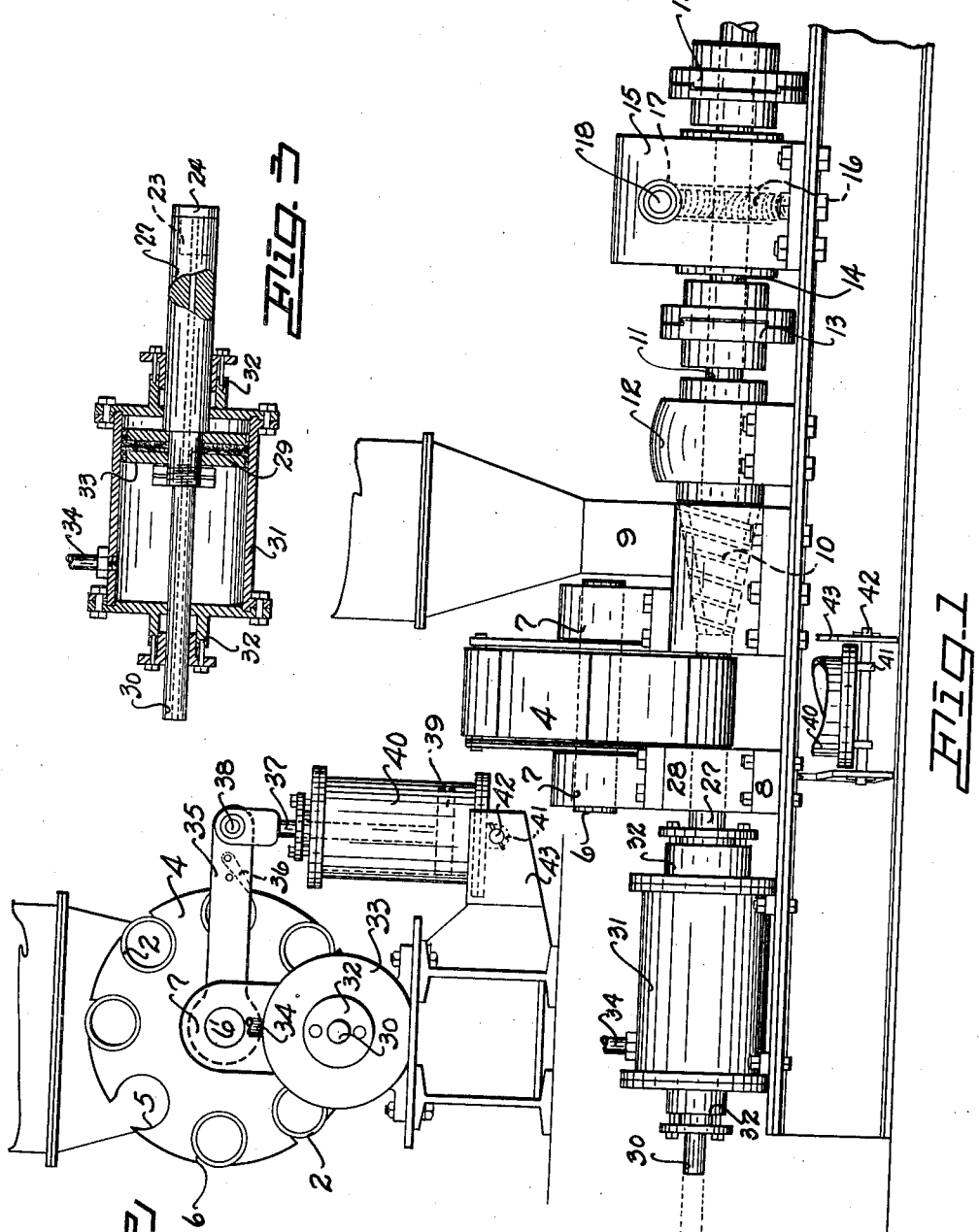
Robert T. Bowling
INVENTOR
BY Herbert E. Smith
ATTORNEY Oct. 4, 1932.   R. T. BOWLING   1,881,397
BRIQUETTING MACHINE
Filed May 31, 1930   3 Sheets-Sheet 2

ROBERT T. BOWLING
INVENTOR
BY Herbert E. Smith
ATTORNEY

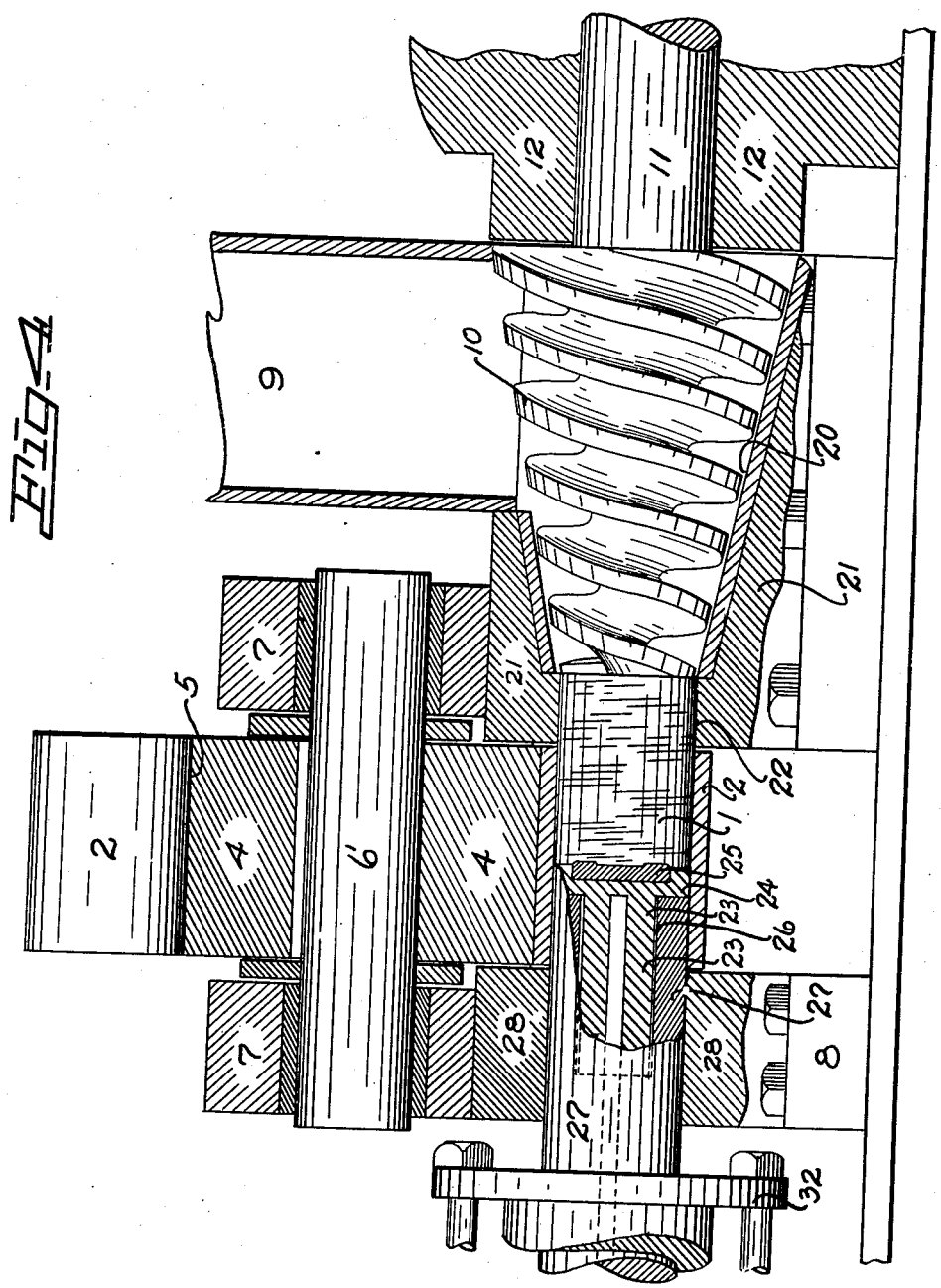

Patented Oct. 4, 1932

1,881,397

UNITED STATES PATENT OFFICE

ROBERT T. BOWLING, OF LEWISTON, IDAHO, ASSIGNOR, BY MESNE ASSIGNMENTS, TO POTLATCH FORESTS, INC., OF LEWISTON, IDAHO

BRIQUETTING MACHINE

Application filed May 31, 1930. Serial No. 458,580.

My present invention relates to an improved briquetting machine or press, for molding solid cylindrical briquettes from saw dust, wood shavings, vegetable fibers etc. The press is of the type utilizing a tapered feed screw which forces the material through a stationary die into a cylindrical mold, against the resistance of a movable die, and means are provided for varying the resistance of the movable die in order to modify the density of the solid cylindrical briquette.

A plurality of molds are employed in an intermittently rotated mold carrier which is located transversely of the longitudinal axis of the press and interposed between the stationary die and feed screw at one side and the movable die at the other side. The rotary mold carrier is intermittently operated to remove a briquette from the dies and to move an empty mold to position for use with the two dies and the feed screw of the press.

The material is laid in the hollow cylindrical mold in a continuous spiral layer having a width equal to the radius, or one half the diameter of the cylindrical mold, and the finished solid briquette is thus formed of spiral laminations which strengthen and reinforce the body structure of the briquette.

The sap, resin, pitch, and other moisture present in the wood shavings, saw dust, or fibers, is expressed therefrom by the press and this moisture is used as a binder for cementing the particles together, and for cementing together the continuous layers as the briquette is formed in the press.

The feed screw of the press is tapered, and the action of the tapered screw is instrumental in generating friction with consequent heat in the moist material, to assist in utilizing the moisture as a binder, and means are provided for drying and hardening the completed briquette for efficient use as a fuel.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention, but it will be understood that changes and alterations may be made in the exemplified structures, within the scope of my claims without departing from the principles of my invention.

Figure 1 is a view in side elevation of the machine of my invention, the left end of a duplex machine being shown.

Figure 2 is an elevation as seen from the left end of Figure 1.

Figure 3 is a sectional detail view of the movable or resistance die, with its hydraulic connections.

Figure 4 is an enlarged detail sectional view showing the relation of the feed screw, the dies, and the rotary mold carrier.

Figure 8:
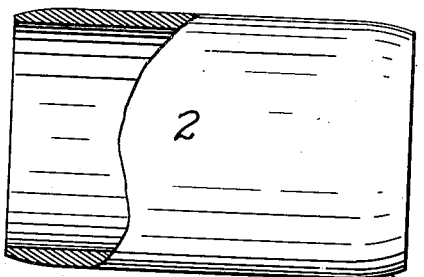
Figure 8 is an enlarged view of one of the cylindrical molds, partly broken away.
Figure 9:
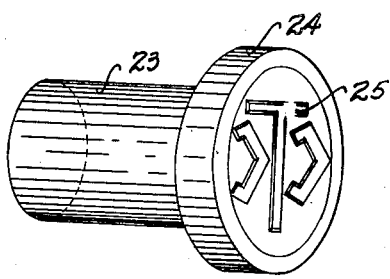
Figure 9 is a perspective view of the movable die having thereon a brand or mark to be impressed in the briquette.

The completed briquette 1 in Figure 4 is a solid cylindrical body formed of a continuous ribbon or layer laid in spiral formation against preceding laminations, and the material is pressed in this form within the metal cylindrical mold 2 having rounded or tapered ends 3, as seen in Figure 8.

These molds are placed in a carrier or circular disk 4 that is fashioned with sockets 5, and one end of the wall of the circular socket 5 terminates in an abrupt shoulder as 6 for a purpose to be described.

The rotary carrier is mounted on a shaft 6' that is journaled in bearings 7 above the longitudinal axis of the press, and the operating parts of the press are supported on the base frame 8.

The material to be formed into briquettes is fed through a feed hopper 9 below which is located a tapered feed screw 10 with its larger end at the mouth of the feed hopper to receive the material. At its larger or intake end the feed screw is fashioned with an axial shaft 11 journaled in bearings 12, and this shaft is driven through a clutch or coupling 13 and shaft 14 from the centrally located gear case 15, in Figure 1. Within the gear case is located a worm wheel 16 on the shaft 14 and a worm gear 17 on a transversely arranged drive shaft 18 imparts power to the press.

An additional clutch or shaft coupling 19 is indicated in Figure 1, complementary to the clutch 13, for transmitting power to a complementary press that may be used as a duplicated part of the briquetting machine here described.

The tapered feed screw revolves within a tapered or conical drum or shell 20, and this drum or shell is fixed within a tapered die member 21 that terminates in a short, cylindrical throat 22 that co-acts with the mold 2 in the formation of the briquette.

The die member at 22 is the same diameter as the inner bore of the mold 2, and the port or cylindrical throat 22 of the fixed die is complementary to the smaller end of the conical or tapered feed screw 10.

The briquette is fashioned or pressed in the mold, by the feed screw, against a yielding pressure that is afforded by the resistance of a movable die, which movable die is retracted at a slightly slower rate of speed than the feed of the material through the die 22. This difference in the speed of travel of the retracting die and the feed of the material results in a compression of the material within the mold, and insures a compact, spiral arrangement of the laminations in the briquette.

The movable die is axially arranged or alined with the axis of the feed screw, and the die is projected by hydraulic pressure and retracted by the feed pressure of the feed screw which overcomes the pressure back of the die.

The die 23 is a cylinder with a bore along its longitudinal axis, and the die is fashioned with a flanged annular head 24 in the face of which head are provided suitable identification marks as 25, which are impressed in one end of the briquette during its process of molding or pressing.

The removable die 23 is seated in a socket 26 of the die-holder 27, and the holder slides or reciprocates in a bearing 28 provided therefor. At its rear end the holder has a reduced end 29, and a further reduced stem 30, and these parts are arranged along the longitudinal axis of a hydraulic cylinder 31 having end packing boxes or glands 32 for the holder and reduced stem of the die. A piston 33 is fixed on the part 29 of the holder, and the motive fluid for the piston flows into the cylinder at 34, back of the piston to project the die to the right in Figure 4, and escape of the motive fluid from the cylinder is controlled by a suitable valve in the pipe 34 as the feed screw pushes or presses the material and the movable die to the left in Figure 4, the extreme outward movement of the piston stem 30 being indicated by dotted lines in Figure 1. In Figure 3, the yielding die is projected to the extreme right, while in Figure 4 the yielding die has been moved approximately half way through the mold during the process of formation of the briquette.

The rotary carrier and its molds of course remain stationary while the briquette is being formed or pressed, but as soon as the mold is filled with the pressed material, the operation of the feed screw is discontinued, and the hydraulic pressure on the yielding die is relieved. The molded or pressed briquette is now ready to be removed from its position with relation to the dies, and at the same time an empty mold is brought to position between the two dies to receive another briquette part of which is already formed in the die 22.

The carrier is intermittently turned by means of hydraulic pressure, and the completed briquette is sheared off between the face of the stationary die and the carrier as the carrier is turned. Provision is made for eight molds in the carrier, and it will be understood that a loaded mold is ejected from the carrier and replaced by an empty mold in order that the empty molds may successively be presented to the dies.

Figure 5:
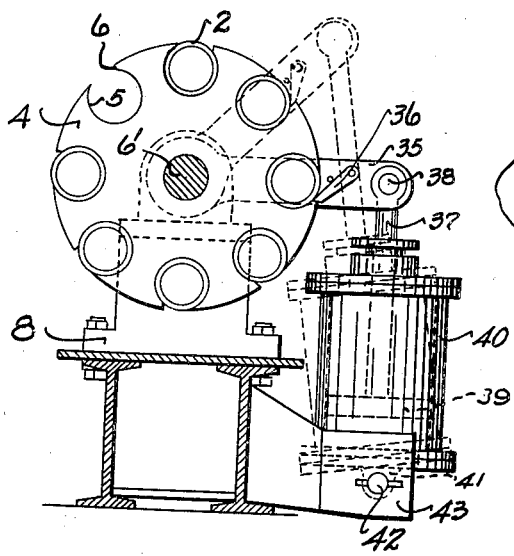
Figure 5 is a sectional view of the machine disclosing particularly the rotary mold carrier and its hydraulic operating mechanism.
Figure 6:
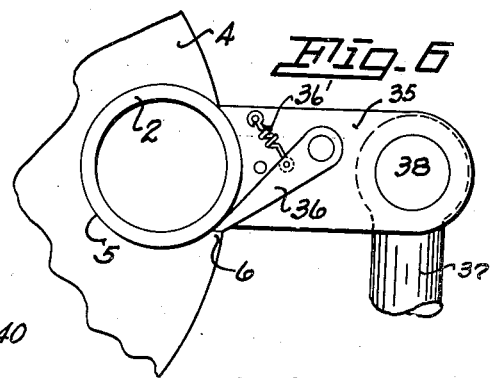
Figure 6 is an enlarged detail view showing the actuating means or ratchet drive for the rotary mold carrier.
Figure 7:
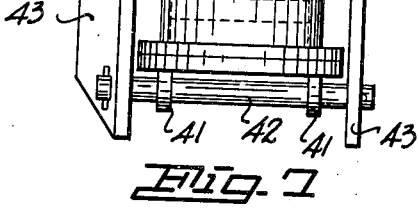
Figure 7 is a detail view of the oscillatable mount for the hydraulic motor of the rotary mold carrier.

In its operation the carrier is preferably turned anti-clockwise in Figures 2 and 5, and this turning movement is accomplished at intervals by a lever 35 pivoted on the shaft 6' of the carrier. The lever carries a pawl 36, and the spring 36' of the pawl or ratchet holds the latter in position to engage a shoulder 6 of the carrier.

At its outer free end the lever is pivoted to a piston stem 37, as at 38, and the stem has a piston 39 (dotted lines Figure 2) reciprocable in the hydraulic cylinder 40 which is provided with suitable inlet and outlet pipes for the motive fluid, and controlling valves, whereby the lever may be elevated to dotted position in Figure 5, and then be given a working stroke to turn the carrier as indicated.

To compensate for the movement of the lever, the cylinder is mounted to oscillate, and the bottom of the cylinder is provided with spaced ears 41 through which the pin 42 is passed and this pin is journaled in bearings of a bracket 43 rigid with the frame of the machine.

In the formation of the tapered feed screw, the threads, the pitch and the angle of the threads may be varied, together with the length and tapered diameter of the screw, to suit different conditions. The feed screw in pressing or feeding the material into the molds against the yeilding die may develop a pressure as high or higher than twenty tons, and the pressure, combined with the heat generated by friction at the smaller end of the feed screw, binds the material in a most effective manner as the spiral laminations are laid. As before stated, the sap, resin, pitch, and other moisture expressed from the material, provides the binding agency, and the latter is spread over the entire laminated area of the briquette to firmly bind the parts together.

By varying the yielding pressure of the movable die to increase or decrease its resistance against the feed screw and material, the briquette may be given greater or less density, as desired.

Having thus fully described my invention, what I claim as new and desire to secure by Letters Patent is:

1. In a briquette machine, the combination with a tapered feed screw and a stationary die through which the material is fed, of a mold carrier and a plurality of molds therein, a movable die and means for reciprocating said die through the mold, and means for affording the movable die a yielding resistance against the feed of the tapered screw as the briquette is formed.

2. In a briquette machine, the combination with a stationary die having a cylindrical port and a feed screw for passing material under pressure through said port, of a mold adapted to receive the material from the port, a movable die co-acting with the mold in the formation of the briquette, and means for affording the movable die a yielding resistance against the pressure of the material.

3. In a briquette machine, the combination with a stationary die having a cylindrical port and a tapered feed screw for passing material under pressure through said port, of a cylindrical mold to receive the material from the port, a movable die adapted to traverse the length of the mold, and means for affording the movable die a yielding pressure or resistance against the pressure of the material.

4. In a briquette machine, the combination with a stationary die having a cylindrical port and a tapered feed screw for passing material under pressure through the port, of a rotary mold carrier and means for intermittently operating the carrier, a plurality of molds in the carrier one of which is adapted to receive material from said port, a movable die adapted to traverse the length of a mold, and means for affording the movable die a yielding resistance against the pressure of material in the mold.

5. In a briquette machine, the combination with a stationary die having a cylindrical port and a tapered feed screw for passing material through said port, of a rotary mold carrier and means for intermittently operating the carrier, a plurality of molds in the carrier one of which is adapted to receive material from said port, a movable die adapted to traverse the length of a selected mold and hydraulic means for actuating said movable die, and means for controlling said hydraulic means whereby a yielding resistance is afforded by the movable die against the pressure of the material in the mold.

6. In a briquette machine, the combination with a stationary die having inlet and outlet openings, and means for feeding material therethrough under pressure, of a mold having an inlet port alined with and adjacent said outlet opening to receive material therefrom, a reciprocable die adapted to traverse the length of the mold and terminate its in-stroke at said outlet opening, and means for affording the reciprocable die a yielding resistance to the briquette on the outstroke of the reciprocable die.

7. In a briquette machine, the combination with a stationary die having inlet and outlet openings, and means for feeding material therethrough under pressure, of a rotary carrier having a plurality of molds each having an inlet port adapted to successively aline with and be located adjacent said outlet opening, a reciprocable die adapted to traverse the length of the mold and terminate its in-stroke at said outlet opening, and means for affording the reciprocable die a yielding resistance to the briquette on the outstroke of the reciprocable die.

In testimony whereof I affix my signature.

ROBERT T. BOWLING.